(12) United States Patent
Williams

(10) Patent No.: US 7,155,683 B1
(45) Date of Patent: Dec. 26, 2006

(54) COMMUNICATION TERMINAL HAVING A PREDICTIVE EDITOR APPLICATION

(75) Inventor: Stephen Williams, Coppell, TX (US)

(73) Assignee: Nokia Corporation, Espoo (FI)

( * ) Notice: Subject to any disclaimer, the term of this patent is extended or adjusted under 35 U.S.C. 154(b) by 1124 days.

(21) Appl. No.: 09/507,945

(22) Filed: Feb. 22, 2000

(30) Foreign Application Priority Data

Feb. 22, 1999 (GB) .................................. 9904013.1

(51) Int. Cl.
*G06F 3/00* (2006.01)

(52) U.S. Cl. ..................... 715/816; 715/739; 715/745

(58) Field of Classification Search ................ 345/816, 345/853, 854, 783, 739, 745, 841; 707/7; 715/739, 741, 745, 783, 816, 853, 854

See application file for complete search history.

(56) References Cited

U.S. PATENT DOCUMENTS

| | | | |
|---|---|---|---|
| 5,664,896 A | 9/1997 | Blumberg | 400/485 |
| 5,742,669 A | 4/1998 | Lim | 379/130 |
| 5,797,098 A * | 8/1998 | Schroeder et al. | 379/355.05 |
| 5,818,437 A | 10/1998 | Grover et al. | 345/326 |
| 5,838,783 A | 11/1998 | Cheng et al. | 379/355 |
| 5,952,942 A * | 9/1999 | Balakrishnan et al. | 341/20 |
| 6,011,554 A * | 1/2000 | King et al. | 345/168 |
| 6,185,295 B1 * | 2/2001 | Frederiksen et al. | 379/355.05 |
| 6,392,640 B1 * | 5/2002 | Will | 345/184 |

FOREIGN PATENT DOCUMENTS

| | | |
|---|---|---|
| EP | 0570116 A1 | 11/1993 |
| EP | 0732646 A2 | 9/1996 |
| WO | WO 97/04580 | 2/1997 |
| WO | WO 97/05541 | 2/1997 |
| WO | WO 98/08688 | 3/1998 |
| WO | WO 98/33111 | 7/1998 |
| WO | WO 99/15952 | 4/1999 |

OTHER PUBLICATIONS

"Nokia 3210 User's Guide", "Nokia, Online", 1999, pp. 39-41.

* cited by examiner

Primary Examiner—Weilun Lo
Assistant Examiner—Truc T Chuong
(74) Attorney, Agent, or Firm—Perman & Green, LLP

(57) ABSTRACT

A communication terminal having a display; a keypad having a plurality of keys associated with several letters each; a processor for controlling the display in accordance with the operation of the keypad; a selectable predictive editor program for generating an output containing words matching a received string of ambiguous key strokes, the predictive editor program has a number of associated vocabularies including at least one language dependent dictionary and at least one dictionary receiving user defined inputs. An editor application is controlled by the processor which communicates with said predictive editor programs for generating matching words based on an ambiguous string of key strokes. A second memory of the communication terminal for storing user inputted data. The processor automatically searches the second memory for words and copies these words into the dictionary for receiving user defined inputs associated with said predictive editor program.

3 Claims, 6 Drawing Sheets

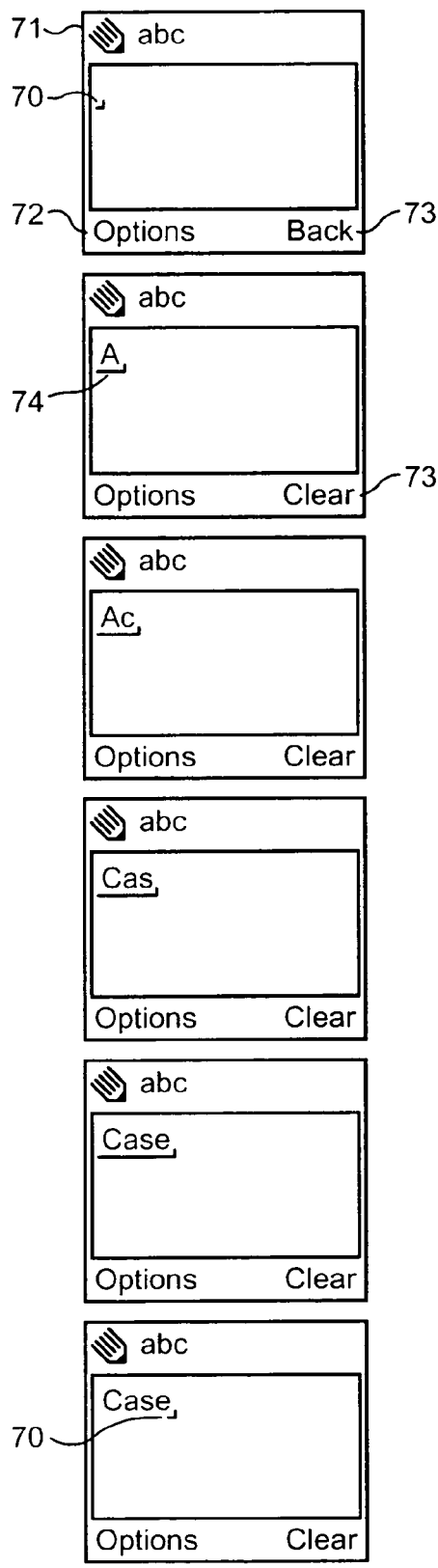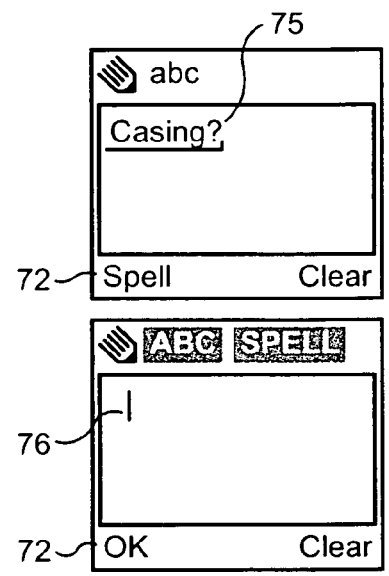
FIG. 6
FIG. 8

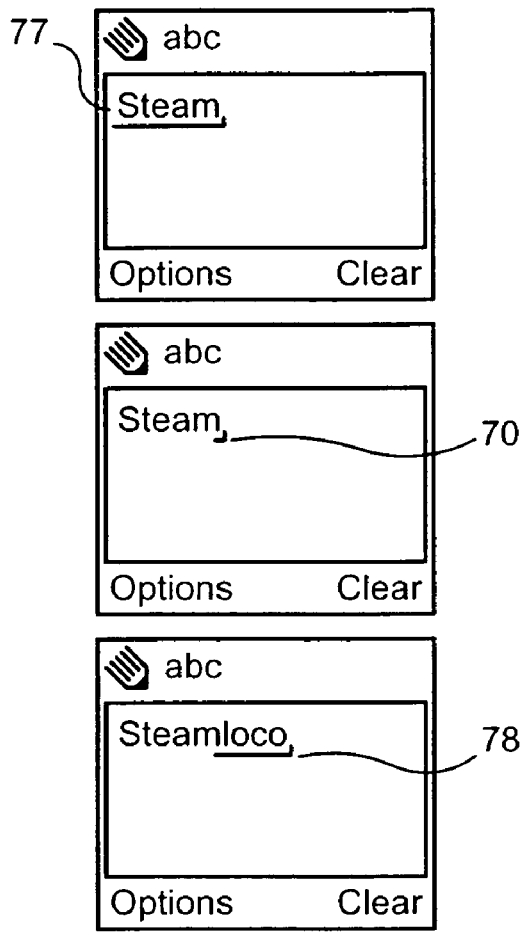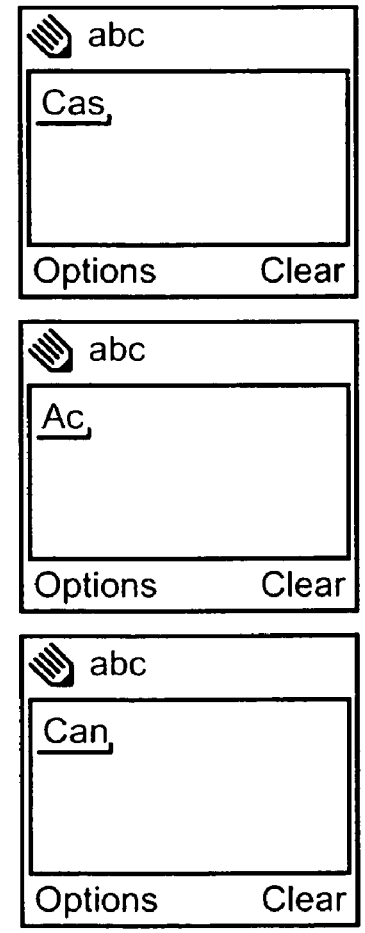
FIG. 9                    FIG. 10

US 7,155,683 B1

COMMUNICATION TERMINAL HAVING A PREDICTIVE EDITOR APPLICATION

BACKGROUND OF THE INVENTION

The invention relates to a communication terminal having a predictive editor application for entering and editing data. Such a terminal can be a cellular or cordless phone or a communicator. The editor is used for editing text for message handling, phonebook editing and searching etc.

Tegic Communications, Inc has developed an intelligent software protocol that allows the users to enter ambiguous key strokes into an electronic device. The predictive editor program, named T9®, automatically determines from all the possible matches, the intended word. The predictive editor program matches entered keystrokes with completed words from a linguistic database. This concept is subject for U.S. Pat. No. 5,818,437 and WO 98/33111.

SUMMARY OF THE INVENTION

An object of the invention is to provide a communication terminal using the predictive editor program allowing the user in an easy way to also handle the most common names of person the user communicates with.

This object is achieved by a communication terminal having a display; a keypad having a plurality of keys associated with several letters each; processor means controlling the display means in accordance with the operation of the keypad; a predictive editor program for generating an output containing word matching a received string of ambiguous key strokes. The predictive editor program has a number of associated vocabularies including at least one language dependent dictionary and at least one dictionary receiving user defined inputs. An editor application controlled by the processor means communicates with said predictive editor programs for generating matching words based on an ambiguous string of key strokes.

Second memory means of the communication terminal is used for storing user inputted data. The processor means automatically searches said second memory means for words and copies these word into said at least one dictionary for receiving user defined inputs and associated with said predictive editor program. Hereby data available in an electronical phonebook database will automatically be copied into the user defined dictionary even though this data was not entered by using the predictive editor program. Also data coming from a new SIM card may enter the user defined dictionary by this concept.

The invention furthermore relates to a communication terminal having a display; a keypad having a plurality of keys associated with several letters each; processor means controlling the display means in accordance with the operation of the keypad; a selectable predictive editor program for generating an output containing word matching a received string of ambiguous key strokes, said predictive editor program has a number of associated vocabularies including at least one language dependent dictionary and at least one dictionary receiving user defined inputs. An editor application controlled by the processor means communicates with said predictive editor programs for generating matching words based on an ambiguous string of key strokes, said editor application stores words that have to be entered in an unambiguous way in one of said least one dictionary receiving user defined inputs. The processor means associates a storing time for the unambiguous entered words stored in dictionary receiving user defined inputs; and the processor means maintains the dictionary containing the unambiguously entered words in accordance with the storing time. The user defined dictionary will hereby delete seldomly used words when the memory becomes full.

The invention does furthermore relate to a communication terminal with a keypad having a key for requesting the processor to replace said one word from the list of matching words, and said processor handled this list of matching words as and endless loop. Hereby alternative matches becomes available in an easy way.

The invention does furthermore relate to a communication terminal with a keypad having a key for requesting input of a special sign from a list of special signs in the text string, and wherein the keypad has a key for requesting the processor to replace a special sign with the next special sign from the list of special signs, and said processor handled this list of special signs as an endless loop. Hereby alternative special signs become available in an easy way.

Finally the invention relates to a communication terminal having an editor application that opens a word for editing with the predictive editor program when a cursor is placed at the beginning or the end of the word, whereby the editor application regenerates a sequence of key strokes based on the presently displayed match, and whereby the editor application adds new key strokes to the regenerated sequence of key strokes in dependence of the position of the cursor and the key pressed. the editor is hereby able to regenerate the sequence of key strokes and the user does not have to re-enter the full word when he wants to add a new beginning or ending to the word.

BRIEF DESCRIPTION OF THE DRAWING

For a better understanding of the present invention and to understand how the same may be brought into effect reference will now be made, by way of example only, to accompanying drawings, in which:—

FIG. 6 illustrates a sequence of displays illustrating the text entry according to the invention.

FIG. 8 illustrates a sequence of displays illustrating the handling no matching words according to the invention.

FIG. 9 illustrates a sequence of displays illustrating the handling of a compound word according to the invention.

FIG. 10 illustrates a sequence of displays illustrating the text clearing according to the invention.

DETAILED DESCRIPTION OF THE INVENTION

Figure 1:
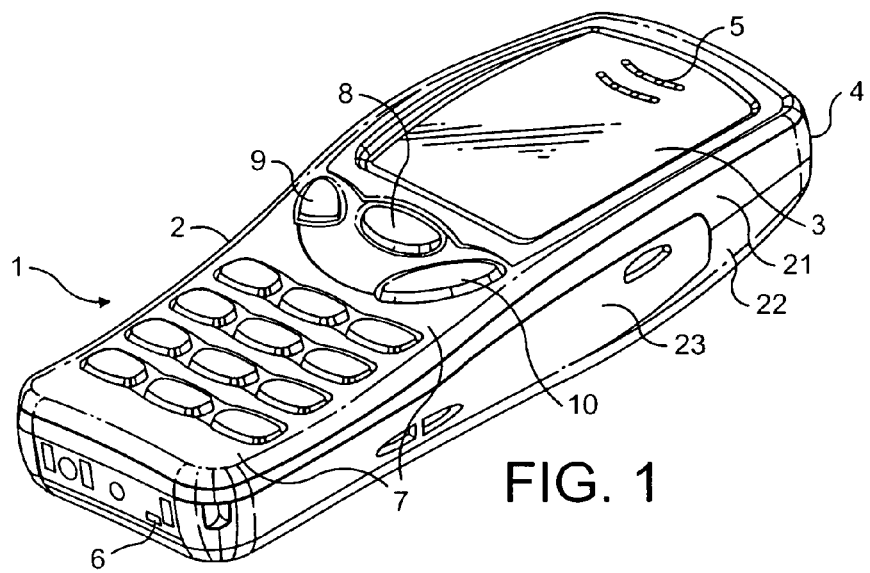
FIG. 1 schematically illustrates a preferred embodiment of a hand portable phone according to the invention.
Figure 3:
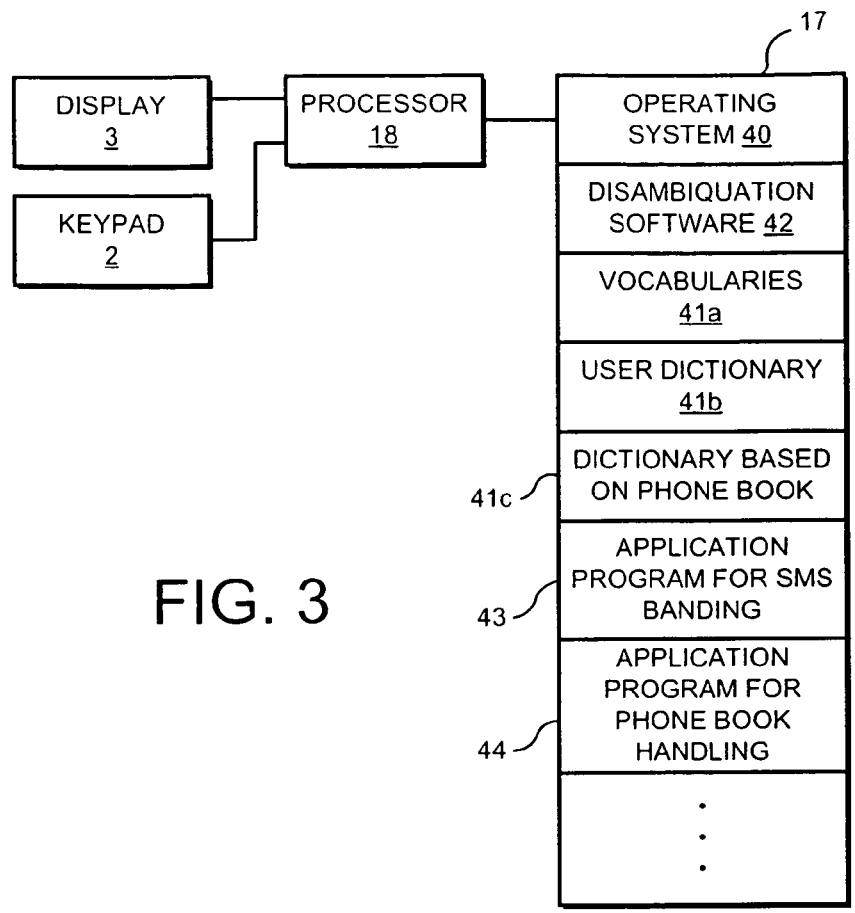
FIG. 3 shows the major components of the predicitive editor according to a preferred embodiment of the invention.

FIG. 1 shows a preferred embodiment of a phone according to the invention, and it will be seen that the phone, which is generally designated by 1, comprises a user interface having a keypad 2, a display 3, an on/off button 4 FIG. 3), a speaker 5 (only openings are shown in FIG. 1), and a microphone 6 (only openings are shown in FIG. 1). The phone 1 according to the preferred embodiment is adapted for communication via a cellular network, but could have been designed for a cordless network as well.

According to the preferred embodiment the keypad 2 has a first group 7 of keys as alphanumeric keys, a soft key 8, and a navigation key 10. Furthermore the keypad includes a "clear" key 9. The present functionality of the soft key 8 is shown in a separate field in the display 3 just above the key 8. This key layout is characteristic of the Nokia 3110™ phone and the Nokia 5110™ phone.

The phone 1 has an inner housing of which gripping areas 23 are visible. An exchangeable front cover 21 and rear cover 22 are snapped onto the inner housing.

Figure 2:
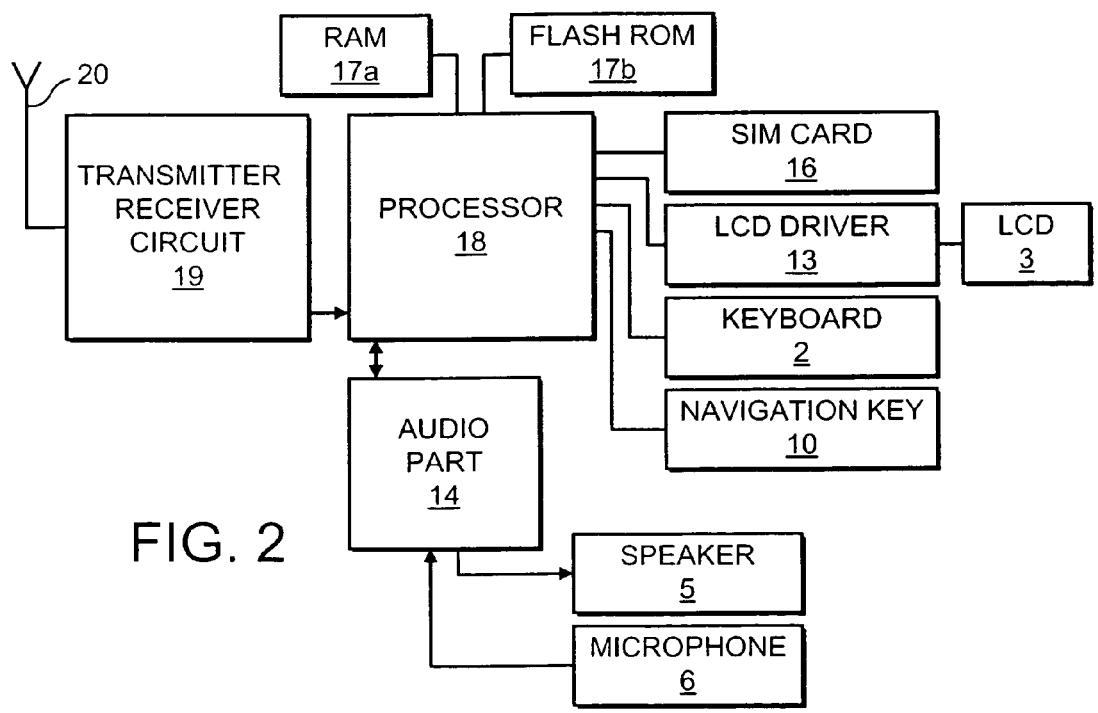
FIG. 2 schematically shows the essential parts of a telephone for communication with a cellular or cordless network.

FIG. 2 schematically shows the most important parts of a preferred embodiment of the phone, said parts being essential to the understanding of the invention. The preferred embodiment of the phone of the invention is adapted for use in connection with the GSM 900 MHz and GSM 1800 MHz network, but, of course, the invention may also be applied in connection with other phone networks. The processor 18 controls the communication with the network via the transmitter/receiver circuit 19 and an antenna 20 that will be discussed in details below.

The microphone 6 transforms the user's speech into analog signals, the signals formed thereby are A/D converted in an A/D converter (not shown) before the speech is encoded in an audio part 14. The encoded speech signal is transferred to the processor 18, which i.a. supports the GSM terminal software. The processor 18 also forms the interface to the peripheral units of the apparatus, including a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

Basic Operation of the Predictive Editor

FIG. 3 shows the major components of the predicitive editor according to the invention. The man-machine interface is established by the display 3 and the keyboard 2. The processor 18 executes instructions and reads and writes data from a memory 17. Software instructions in the memory 17 include an operating system 40, a disambiguation program 42 and its vocabularies 41, and optionally one or more application programs 43, 44.

Target applications programs 43, 44 for the predicitice editor used in a handset include the electronic phone book memory, notepad, messages, calendar, and internet browsing.

According to the preferred embodiment of the invention the predictive editor will be used as an alternative together with the standard text editor used in handsets. This standard editor is also based on a plurality of keys each associated with several letters. However the individual letter is selected by multi-pressing the key in question.

Data is entered on the keypad 2 which comprises of individual alpha-numerical keys 7. Most of these keys 7 have multiple meanings, represented by letter, numbers and symbols printed on the keys. The entered text is shown in the display 3 of the phone. The text already entered (and accepted by the user) is shown in the same text format as the standard display format of the phone. The word presently being entered is underligned or reversed in colors in order to indicate that the letter string has not been fixed yet. The predictive editor is able to interprete individual keys and multiple key sequences in several ways simultaneously.

A selection list 50 lists the various interpretations and options. A selection key 51 steps through items in the selection list 50, allowing the user succesively to replace the displayed candidate with the following candidate on the list 50. The list 50 is handled as an endless loop whereby the originally displayed candidate is displayed again when the user has scrolled trough the other items on the list by using selection key 51. The candidate is selected by pressing a spacer key 53.

System Architecture

Figure 4:
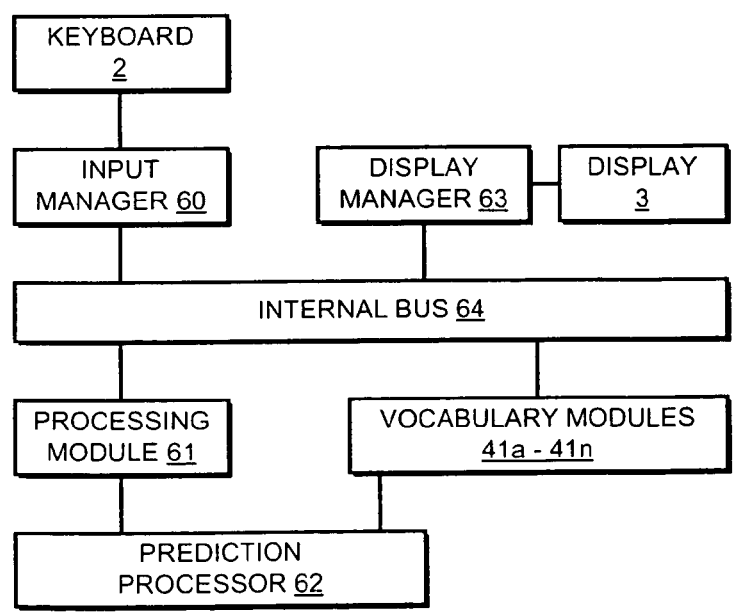
FIG. 4 shows the architecture of the ambiguity eliminating software according to a preferred embodiment of the invention.

FIG. 4 shows the architecture of the disambiguating software. An input from a keypad 2 is processed in an input manager 60. Input data is via internal bus means 64 passed to a processing module 61, which keeps a record of the current key sequence until the user has accepted a word based on this sequence by pressing the space key 52. When a key stroke has been received by processing module 61, the current key sequence is communicated via internal bus means 64 to a predicition processor 62, which forwards the sequence to one or more modules 41 acting as electronic vocabularities.

The vocabulary modules 41a, 41b, 41c, . . . 41N work in parallel and respond individually if they contain data matching the current key stroke sequence. One vocabulary module 41a might include a dictionary containing words in a language, e.g. English, defined by the user and used as editing language. According to the preferred embodiment some of the vocabulary modules 41a, 41b, 41c, . . . 41N may contain personalized user defined words, e.g entered by using the standard editor of the phone (when the predictive editor did not find the word the user was looking for) or by copying the names from the phonebook into one of the vocabulary modules. In the preferred embodiment vocabulary module 41b and 41c contains the word entered by the standard editor and word copied from the phonebook, respectively.

The vocabulary modules 41a, 41b, 41c, . . . 41N often supply a plurality of matching word—either being displayed or available through the selection list 50. The predicition processor 62 accumulates a complete list of matching words for the selection list 50 from all vocabulary modules 41a, 41b, 41c, . . . 41N. When prediction processor 62 has finalized the processing, the processing module 61 transfers the selection list 50 to a display manager 63 and the display 3 via the internal bus means 64.

In the most cases, the disambiguation software will work as an editor server and therefore pass data strings directly to another client or application program 43, 44 running on the processor 18, too. In this case the keypad 2, the input processor 60 and the display manager 63 will be integrated in the application program 43, 44 using the predictive editor as a server. These applications may include the electronic phone book memory, notepad, messages, calendar, and internet browsing.

Vocabulary Look-Up Processing

Vocabulary look-up processing is handled by a computer program being available on the market today. Therefore these parts will not be discribed further. Both the disambiguation software and the basic dictionaries in a plurality of languages are available from Tegic Communications, Inc. under the tradename T9. As well the disambiguation software and the basic dictionaries (e.g. the English one) requires 100 kbyte memory space each. The basic dictionaries are compressed in order to reduce the memory requirements. The user defined directories are less memory consuming and only requires 2–4 kbyte each according to the preferred embodiment. These dictionaries are not compressed and work advantagously according to the first in first out principle.

Userinterface for the Predictive Editor Program.

The preferred embodiment of the predictive text input according to the invention will be based on Tegic's T9 technology. The core functionality of T9 is as discussed above its ability to generate the intended text onto the screen from ambiguous keystrokes entered on a phone keypad, requiring only one keystroke per letter. This provides a more efficient method of entering text than the traditional multi-tap method requiring many more keystrokes per letter due to the multiple mappings of letters to a given key.

The predictive editor program makes this possible because it is based on a large intelligent dictionary that allows the editor to predict what word the user intended based on the number of key-presses and combination of key-presses. Often several words will match the keystrokes that are input and the user chooses the desired match from those offered by the predictive editor program.

Figure 5:
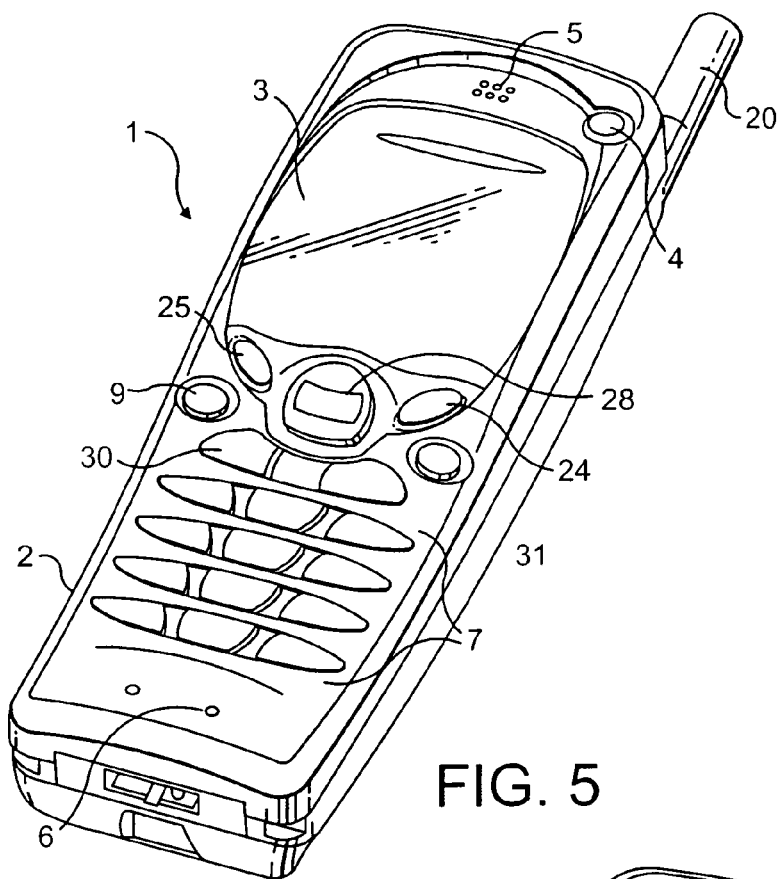
FIG. 5 schematically illustrates an alternative embodiment of a hand portable phone according to the invention.

While the phone in FIG. 1 had only a single soft key, the phone in FIG. 5 is equipped with two soft keys. FIG. 5 shows an alternative embodiment of a phone according to the invention. The major dirrefence between the two phones shown in FIGS. 1 and 5, respectively, is the keys in the keypad and as it will be explained later the soft key functionality labels displayed in the display 3. The same referral numbers are used in FIGS. 1 and 5 for items having similar functionality.

According to the alternative embodiment the keypad 2 has a first group 7 of keys as alphanumeric keys, two soft keys 24 and 25, and a navigation key 28 having the same funtionality as the navigation key 10 but placed centrally below the display 3. Furthermore the keypad and off-hook key 30 and an on-hook key 31. The present functionality of the soft key 24 and 25 is shown in separate fields in the display 3 adjacent to said keys. This key layout is characteristic of the Nokia 2110™ phone and the Nokia 6110™ phone.

With reference to FIG. 6 a display sequence illustrating the basic operation of the text input based on the predictive editor program for the embodiment illustrated in FIG. 5. In the initial display (the first display), a cursor 70 indicates that the editor is ready for a "new" word to be typed to the editor. Above the text area an icon 71 indicates the status of the phone (spelling) based on the predictive editor program. Furthermore the two softkey labels 72 and 73 indicates that the functionality of the softkeys during this are "options" and "back". When pressing the "back" softkey 24 the phone leaves the text editing mode and jumps one step up in the menu structure. When pressing the "options" softkey 25 the user is offered a list of actions as "send the text as an SMS", "save the text", "clear the display" and "switch between predictive editor and multi tap editor (the traditional text editor of a phone)". Furthermore the "options" softkey 25 will provide the user with some editing tools that will be discussed later on.

When the phone only has one softkey 8 as shown in FIG. 1, the softkey 8 will have the functionality "options", while the "back" functionality is handled by the clear key 9.

TABLE 1

Layout of the alphanumeric keys 7.

| 1 | <u>65</u> | 2 - abc | | 3 - def |
|---|---|---|---|---|
| 4 - ghi | | 5 - jkl | | 6 - mno |
| 7 - pqrs | | 8 - tuv | | 9 - wxyz |
| * - + | <u>66</u> | 0 -⌣ | <u>67</u> | # -↟ |

Table 1 shows the layout of the alphanumeric key 7. When starting to type a word, the user simply presses the digit key containing the desired letter once. FIG. 6 second to fifth display shows how the user presses the following keys (once) in order to type the word "case":

"2 abc" to insert the "c"
"2 abc" to insert the "a"
"7 pqrs" to insert the "s"
"3 def" to insert the "e"

That means in total only four key-presses.

Often when typing the first few letters of a word, the predictive editor program is not yet able to display the intended characters and may erroneously display an unintended string of characters. These are therefore displayed as merely temporary characters in the display while the predictive editor program is evolving a match. When continuing the typing of the remaining characters in the word, the displayed characters will become more accurate. No matter what the display shows, the user simply types the next character in the word he wants to type.

During the inputting of a word to the predictive editor program, all the characters in the word are shown with underligning 74. This indicates that the word has not yet been finalised and all the characters shown underlined may still change as the predictive editor program evolves a match to the keypresses. As long as the entering of a word is in progress the already entered part of the word remains underligned. It is furthermore seen that the softkey label 73 for the right softkey 24 changes to the "Clear" functionality.

The user accepts a word by pressing the space key (the key 67—table 1), or by switching the predictive editor program off. When the user accepts a word this will be freezed meaning that the predictive editor program is no longer working on it and the marking 74 will be replaced by the cursor bar 70. When spaces between words are deleted, the two words are concatenated into one, but the user is allowed to continue adding characters to the first word. In any situation, the word will be finally inserted, the text will no longer be underlined and the cursor 70 re-appears after the accepted word.

The user can delete characters backwards in a word by simply pressing the "Clear" key 9 once for each character to be deleted. The active word might in this situation also change based on the remaining key sequence. This is illustrated in FIG. 10 where the suggested match "cas" in the display is changed to "ac" by deleting a key stroke and changed again to "can by pressing the "6—mno" key.

If the user deletes a complete word, the phone return to the "initial word entry" mode, and the user can again type a new word.

If the user has typed a word and frozen the word by pressing the space key 67, and then clears this space after the word, then the cursor 70 will be placed at the end of the word but the predictive editor program will at this point no longer be active (the already entered word will not be underligned).

If the user clears from this state, he will remove the last character of existing word, and then this word which was left of the cursor 70 will become underligned and active again.

Special Characters

While the predictive editor program is active, pressing the 1-key 65 will allow a smart insertion of punctuation. This means that the predictive editor program will try to predict, based on the situation, which commonly used punctuation mark, is intended. These may include the period, comma, question mark, exclamation point, and apostrophe. If the user e.g. wants to type the word "can't", he can simply press the following sequence:

"2 abc" to insert the "c"

"2 abc" to insert the "a"

"6 nmo" to insert the "n"

"1" to insert the apostrophe

"8 tuv" to insert the "t"

The default value will most often suggest a period, if no other matches seem appropriate. The match function available on *-key 66 will also work in this situation, allowing the user to toggle through other choices like period, comma and similar special characters available on the 1-key 65.

Inserting digits can be done in two ways. First of all, long-pressing a digit in any situation will directly insert the corresponding digit into the editor. This is convenient when only inserting one or two digits. However, when entering a long string of digits then the menu "Options" has a submenu "Insert Number" that gives access to an insert number query window allowing the user to insert a string of digits. This is done by pressing the corresponding digit keys on the keypad for the numbers desired. After entering the desired number, the user presses an "OK" softkey and the text editting starts again.

The menu "Options" has another submenu "Insert Symbol" in which the user is given access to a plurality of symbols, characters and signs such as: @, $, £ and letters not occuring in the language used in the dictionary. The user can scroll though the candidates by using the "*"-key 66.

Searching Alternative Matches

In some situations, the key sequence typed by the user might allow several words to "fit". In this situation, the predictive editor program will always first suggest the two most "common" words from the core dictionary. Here after all the whole word matches from the user dictionary will be shown, and finally all remaining matches from the core dictionary are shown. In many cases, the user might be looking for another word other than the immediately suggested one. There might be two or more possible matches to the key sequence. This is most often the case with short words.

The user can switch to other possible matches by pressing the *-key 66. This will immediately give the next possible match.

However the "options" softkey 25 will include a submenu called "matches" giving access to a list of matches the user can scroll though the list by pressing the left soft key 25 that will have the functionality "Next match". The alternative match candidate will replace the active underligned word in the text and the alternative match candidate is selected in the same way as the default match candidate—e.g. by pressing the space-key 67. The list is handled as a loop. If no matches beyond what is already displayed then a note will be displayed saying "No Match Found".

If there are several matches to the key-sequence typed by the user, pressing the *-key 66 will immediately give the next possible match (the second most common match). A specific match from the *-key 66 is finalized by finalising the word as usual e.g. by inserting a space.

When the left softkey 25 is used for matching purpose the right softkey 26 has and "Undo" functionality. This means when a match other than the default match is shown pressing the right softkey 26 will clear the match and revert to the first match for that key sequence. Pressing the clear key 9 will undo a match, effectively backstepping one match.

If the cursor 70 is touching a word that is not underligned and therefor not active, pressing the *-key 66 will also make the word active again and offer the next match.

No Matching Word

If the predictive editor program runs out of possible word matches during the typing of a word, the display will show a unique error symbol 75; FIG. 8, first display after the entered characters and the left Softkey 25 (FIG. 5) will change functionality label 72 from "Options" to "Spell" providing a shortcut to the insert word query where the user can manually enter the desired word based on the multi tap editor normally used in the phones. The query should appear empty as seen in the second display of FIG. 8. The user is allowed to enter letters by the well known multi-tap method in the position marked by the bar 76. The user accepts the word by pressing the left soft key 25 having the functionality label 72 whereby the editor returns to editing by using the predictive editor program.

When the phone has only a single softkey 8 as in FIG. 1 the Softkey 8 will change from "Options" to "Insert" also providing the shortcut to the insert word query where the user can manually enter the desired word. The query should appear empty.

If the user continues to use the predictive editor program the last entered character will hence be displayed as an error symbol, to indicate to the user that no further possible words matches to the typed key sequence. The phone will emit a short alert beep to draw attention to indicate the lack of matches. If the user types more keys in the situation the display will not show more characters and an information note saying "No Match Found" will be shown.

If the user finds out that he misspelled the word, he can simply press the "Clear" key 9, until the incorrect character can be changed. If the user chooses to accept a misspelled or unknown word e.g. by inserting space character, the error symbol will disappear, and the last recognised word will be inserted into the text.

Cursor Movement

Since the predictive editor program input method basically can only handle adding or deleting at the end of a word, the cursor handling is optimised for this.

Given the situation where the cursor is placed at the end of the text. By using the navigation key 28 for scrolling left the editor will activate the entire word to the left of the cursor 70, allowing the user to add additional characters to the word (using both the pre-existing word and the new key-presses to generate matches).

Scrolling left again will move the cursor 70 to the left of the word (the previously underlined word now no longer active for editing and therefore no longer underlined) and the editor is ready to type a new word.

Scrolling left again moves the cursor to the end of previous word, underlining it, allowing the user to add to that existing word. This cycle repeats when navigating through the text.

If the user moves the cursor 70 through several consecutive spaces, the cursor 70 will be moved one space at a time. Also, when moving through symbols, numbers, etc., the cursor is moved one character at a time.

If the user wants to add a new word to the end or beginning of an existing word by using the predictive editor program, this is simply done by first moving the cursor to the end or beginning of the existing word, respectively. From here, the user simply starts typing the new word.

The editor application opens the already written word for editing with the predictive editor program by placing the cursor in the desired position. Then the editor application regenerates the sequence of key strokes based on the presently displayed matching word. When the editor application adds new key strokes to the regenerated sequence of key stokes in dependence of the position of the cursor and the key pressed. this new string is used by the predictive editor program to find new matches.

If the user wants to edit an existing word by using the predictive editor program, this is done first by moving the cursor just after the word (activating the word in question causing it to be underlined). Then the user can directly add e.g. an ending to the word or if desired, can delete characters by pressing the clear key 9.

Whenever the "Insert Word" query is selected, by pressing OK softkey, the words that were entered in the query are added both to the user dictionary 41b as well as to the main editor window. A confirmation note "Word Saved" appears as well. Upon re-entry to the predictive editor program, insertion point will be after the last letter of the manually only spelled word.

Options Lists

The "Option" menu in the predictive editor program will include some submenu items as:
Matches
Next Match
Insert Word
Insert Number
Insert Symbol
Dictionary The match related items and the insert related items have already been discussed above. All languages supported by the predictive editor program for the phone will appear as choice items under "Dictionary" submenu item. The default language follows advatangeously the display text language of the phone. This default may be to turn the predictive editor program off and revert to traditonal input for the display text language when the predictive editor program does not include a dictionary supporting the language in question. Changing to another language will simply cause the predictive editor program to run in the new language. The user dictionary will not be affected by this.

User Dictionary

The predictive editor program supports a user dictionary, where words not initially known by the program can be stored. Any manually entered string of characters separated by a space will generate a new item in the user dictionary. When words are added to the user dictionary, they will become predictable by the predictive editor program thereafter. The storing of new words to the user dictionary is completely automatic, and is done whenever a new word is created. Only words not already in the core dictionary or the user dictionary will be added under the control of the prediction processor 62.

Words entered using the predictive editor program will already be in the core dictionary and will not need to be added to the user dictionary. However in some languages there exists a few cases where words should be added to the user dictionary. According to the preferred embodiment these cases shall be handled as follows:

When the user creates a compound word in the predictive editor program, the word is added when the word is finalised.

When the user deletes the space (or other delimiter) between two words, resulting in concatenation of these two words. The new word will then be added to the user dictionary after a timeout to avoid accidentally adding words when intention is editing.

Furthermore when names are saved in the phone book they will be linked to the user dictionary so they will be recognised as candidates by T9 when entering text.

When the phone 1 according to the preferred embodiment of the invention is started up or when a new SIM card has been inserted the full phonebook memory from the SIM card 16 is copied to the user directory 41c of the phone. On the SIM card 16 data is stored as preformatted records and these records are copied word by word into the user directory 41c.

For simplicity, the user dictionary is common for all languages. This means that the user dictionary can contain words that were added through the Insert Word submenu in many different languages. The size of a user dictionary will be limited by the available memory, so a user dictionary will be built up as a "cyclic" buffer, where the "oldest" words—when the buffer is full—will be automatically deleted when new words are added. A words creation date is reset each time it is used, so that even though a word was added to the dictionary long time ago, it will not be deleted if frequently used. In summary, the first word to be deleted from the user dictionary will be a word that was added to the user dictionary a long time ago and has not been used much since.

In practice the processor 18 adds the storing time to the dictionary when a word is stored. This storing time will be updated the next time the processor 18 tries to add the same word.

Compound Words

Figure 7:
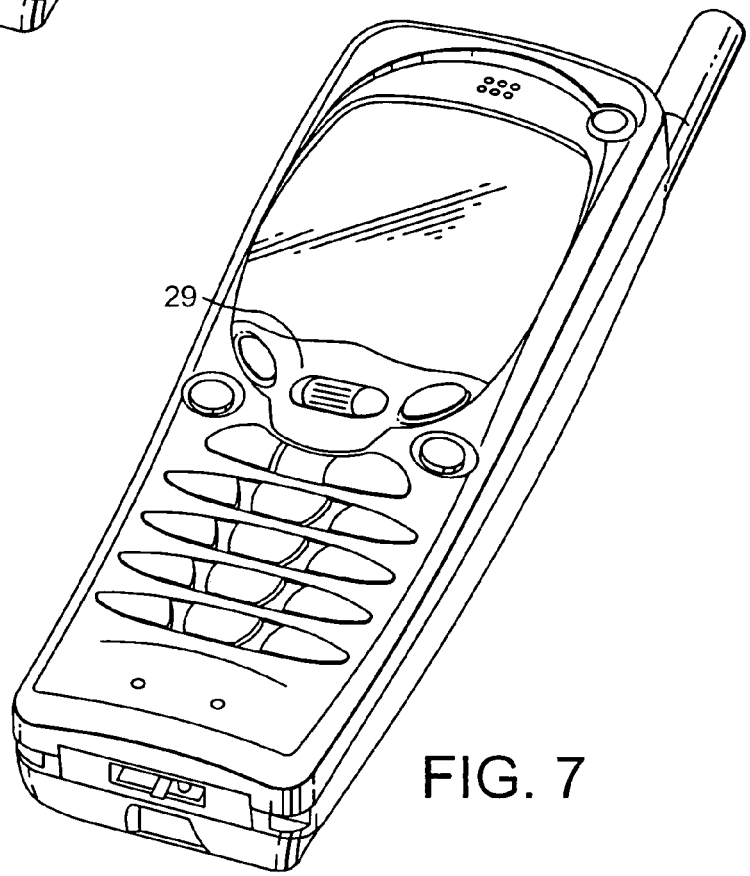
FIG. 7 schematically illustrates a further alternative embodiment of a hand portable phone according to the invention.

In a further alternative embodiment shown in FIG. 7, the navigation key 28 shown in FIG. 5 is replaced by a roller key 29 having scroll up/down functionality and selection by pressing the roller body. This concept is described in the applicants pending U.S. application Ser. No. 08/923,696 filed 4, Sep. 1997. This application is hereby incorporated by reference. In this further alternative embodiment pressing of the roller body will accept the word as it is, and no space will be inserted after the word. This is especially useful to create compound words, which are important in many languages.

In many languages such as German and the Scandinavian languages you are allowed to create new words (compound words) by connecting standard words. The predictive editor program dictionary only contains very common compound words, so it will not guess a Danish word like e.g. "laserkavitetslaengde" meaning "laser cavity length" in English. This is not a problem in English, since compound words hardly occur. But in Danish, German, Finnish etc, it is valuable for the user to type the compound words in parts by writing the first part of the compound word, then "freeze" this part, and then continue with the remaining part of the compound word.

Pressing the navigation key 29 (FIG. 7) or rolling up once or rolling down once would remove the highlighting from under the current word and show the cursor at the end of the word, allowing then user to add additional characters with out changing the start of the compund word intended. The same will be obtained by scrolling left or right once by using the navigation key 10 (FIG. 1) or 28 (FIG. 5). Also, a short press of the power key 4 would also freeze the current word and allow easy creation of a compound word.

FIG. 9 shows how the user has spelled the word 77 "steam", and when this word is still active (underlined) he presses the navigation key 28 whereby the underlining disappears. When the user continues to enter letters only the letters 78 entered after the pressing of the navigation key 28 will be active. However when the entering is finalized the full word "steamlocomotive" will be displayed as a single word.

A further advantage of this concept is that the user when writing the word indicates where he wants to split (wrap the word) the full compound word if he has to split it over two lines in the display.

Figure 11:
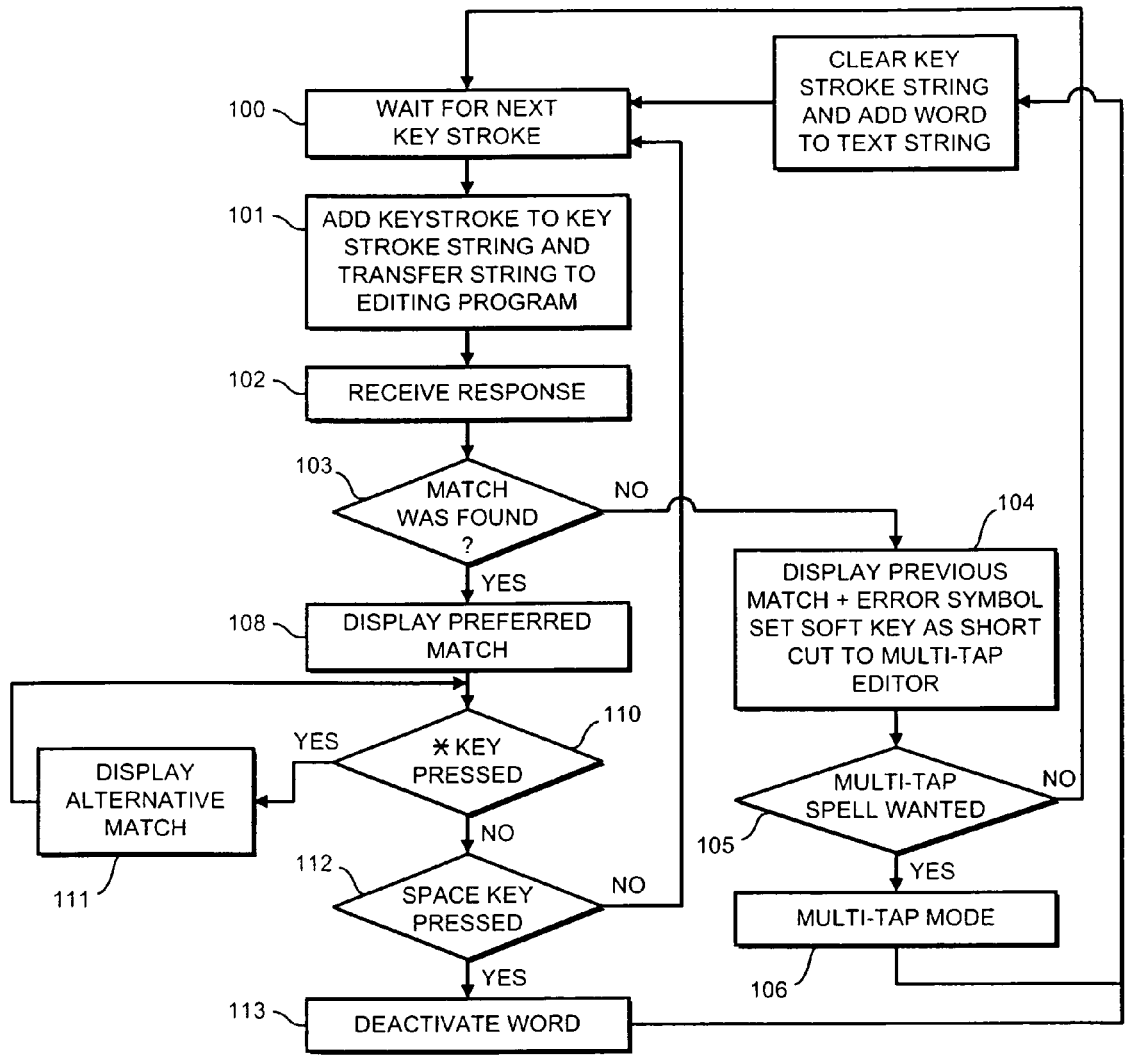
FIG. 11 illustrates a flow diagram for the editor application according to the invention.

The basic editing concept is shown in FIG. 11. When the predictive editor is started up the editor starts to wait for a key stroke in step 100. When a key stroke is detected it is added to a key stroke string and transferred to the predictive editor program in step 101. The predictive editor program responds to this input in step 102 and in step 103 the processor 18 investigates whether the predictive editor program could find possible matches.

If no possible matches is found in step 103 the last possible match is displayed in step 104 together with an error symbol (FIG. 8, first display) and the functionally of the left soft key is changed to a short cut to the multi-tap spell mode.

If the user in step 105 accepts (by pressing the space key) the last possible match this word will be added to the text. Hereafter the key stroke string is cleared in step 106 and the editor starts to wait for a key stroke in step 100.

If the user in step 106 goes to the multi-tap spell mode he can enter the intended word in an unambiguous way (FIG. 8, second display) in step 107. When accepting the entered word by pressing the left soft key 25 this word will be added to the text. Hereafter the key stroke string is cleared in step 106 and the editor starts to wait for a key stroke in step 100.

If the predictive editor program were able to find matches in step 103 the preferred one is displayed in step 108. In step 109 the next key stroke is read. In step 110 it is checked whether the user searches for alternative matches by pressing the "*" key 66. If this is the case the alternative match is displayed in step 111.

In step 112 it is checked whether the user accepts the displayed word by pressing the space key. If this is the case the word will no longer be active and will be added to the entered string of words in step 113. Hereafter the key stroke string is cleared in step 106 and the editor starts to wait for a key stroke in step 100.

If the key stoke is deemed to represent an ambiguous character the editor goes to step 101 for adding the key stroke to the key stroke string for looking for matches.

What is claimed is:

1. A communication terminal having:
    a display;
    a keypad for use in the operation of said communication terminal having a plurality of keys associated with several letters each;
    processor means controlling the display in accordance with the operation of the keypad;
    a predictive editor program for generating an output containing word matching a received string of ambiguous key strokes, said predictive editor program having a number of associated vocabularies including at least one language dependent dictionary and at least one dictionary receiving user defined inputs stored in a first memory which serves said predictive editor program;
    an editor application controlled by the processor means communicates with said predictive editor program for generating matching words based on an ambiguous string of key strokes;
    at least one applications predictive editor program independent of said predictive editor program:
        second memory means of the communication terminal independent of said first memory means for storing user inputted data in an electronic database, said second memory means serving said at least one applications program; and
        wherein said processor means automatically searches said second memory means for words and copies these words into said at least one dictionary for receiving user defined inputs and associated with said predictive editor program.

2. A communication terminal according to claim 1 wherein said second memory means is an electronic phonebook database containing names and associated phone numbers.

3. A communication terminal according to claim 2 wherein said electronic phonebook database is stored on a subscriber identity Module in a cellular phone.

* * * * *